3,466,513
ELECTRICAL CAPACITOR
William R. Belko, Jr., 38 Cedarwood Lane, Huntington, Conn. 06484; Thomas F. Cobb, 16 Arch St., Ansonia, Conn. 06401; and Robert G. Varsane, Donovan Road, Oxford, Conn. 06483
Continuation-in-part of application Ser. No. 609,853, Jan. 17, 1967. This application Jan. 24, 1968, Ser. No. 700,097
Int. Cl. H01g 1/00
U.S. Cl. 317—258                  7 Claims

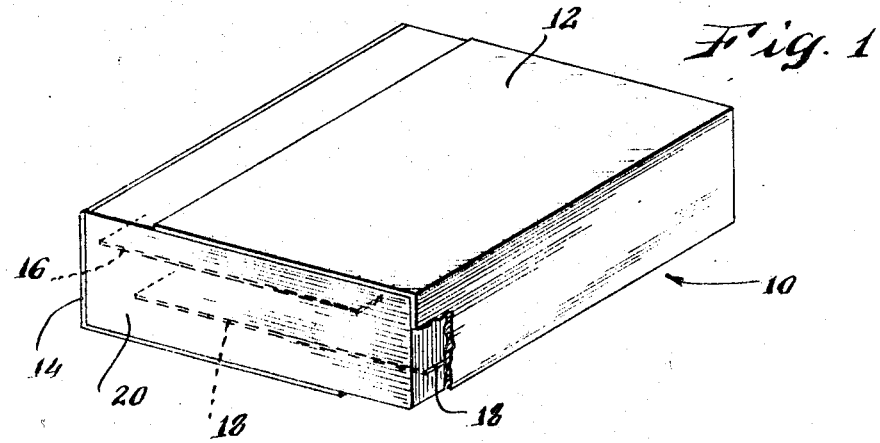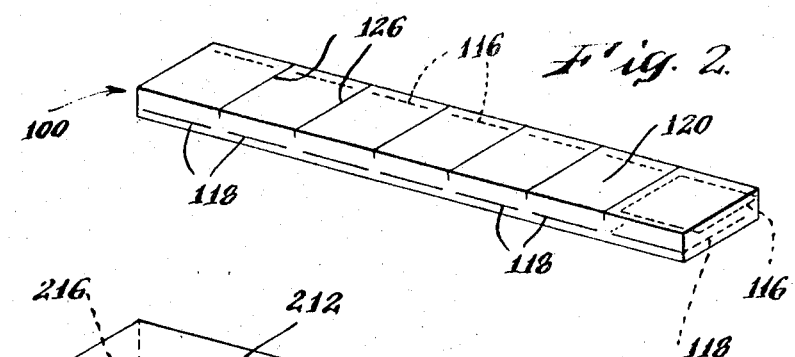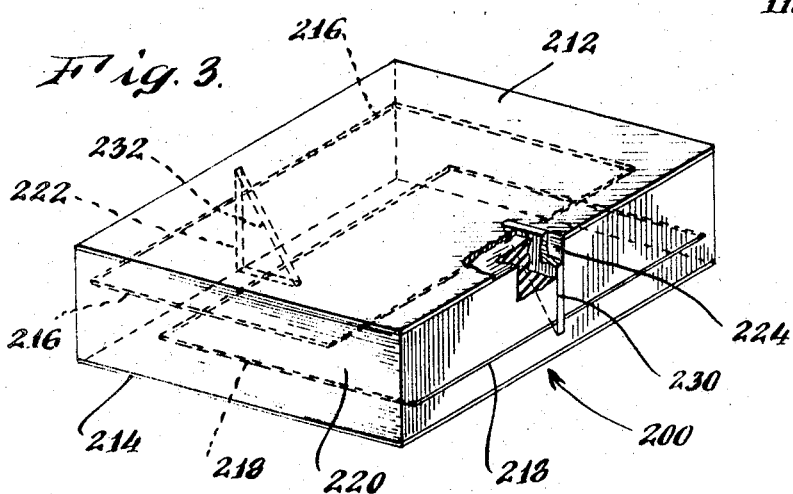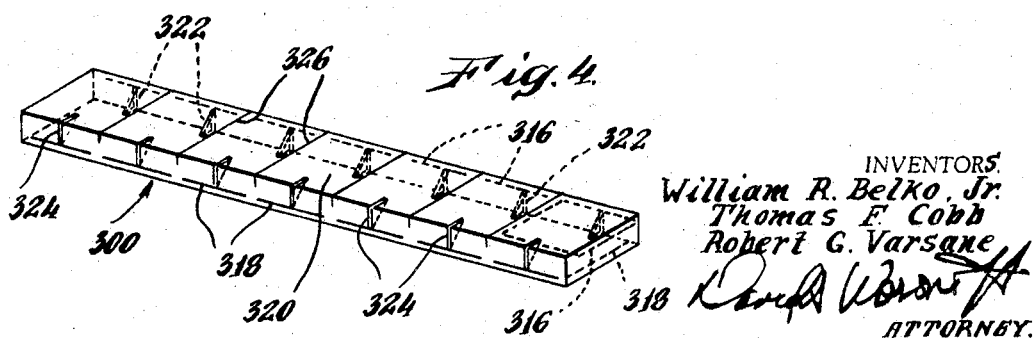
INVENTORS.
William R. Belko, Jr.
Thomas F. Cobb
Robert G. Varsane
ATTORNEY.

ABSTRACT OF THE DISCLOSURE

A capacitor and a method of making a capacitor having at least one internal electrode and at least one external electrode. Each external electrode covers at least a portion of one major surface of the component and at least a portion of one minor surface of the component. The minor surface portion of the external electrode is in electrical communication with at least one internal electrode and preferably the external electrodes and the internal electrodes are made of different conductive materials.

---

This application is a continuation-in-part of an early copending application, Ser. No. 609,853, filed Jan. 17, 1967, now abandoned.

One of the more pressing problems currently facing the electronic component manufacturing industry is the short supply, and corresponding excessive cost, of the platinum metals used as the electrode material in capacitors. The present invention addresses itself to this problem by providing a novel capacitor less dependent on platinum for electrode material and a novel method of manufacturing the capacitor.

Platinum owes its predominance as the most widely used capacitor electrode material, especially in monolithic capacitors i.e., unitary structures in which the various elements comprising the capacitor are fused, sintered or otherwise bonded, because its unique electrical properties, high melting temperature and inert character enables it to be used with a wide variety of dielectric materials. The platinum will not spherodize at the firing temperature of most dielectrics, will not combine with or alter any of the chemical, electrical or physical properties of the dielectric and is not subject to oxidation or other chemical change at firing temperatures. Thus, layers of platinum electrode material can be alternated with layers of porcelain or ceramic dielectric material and the resulting composite fired into a monolithic capacitor having predictable physical and electrical characteristics.

While platinum is, from a physical and electrical standpoint, extremely well suited for its intended use, the aforementioned cost and supply problems have necessitated investigation of alternative metals for the electrode material. Some degree of success has been found with palladium electrodes. However, the inherent tendency of palladium to oxidize at higher temperatures and the corresponding deleterious effect palladium oxide has on certain classes of ceramic dielectrics has required either that this class of ceramics be eliminated as possible dielectrics or that the composite be fired in a protected, oxygen free atmosphere while the temperature rises through the critical palladium oxidation range. Attempts at utilizing other noble metals have not met with any measure of success either because these metals will melt, and thus spherodize, well below the firing temperatures of most ceramics.

The present invention's approach to this problem is to reduce the number of platinum electrodes in the capacitor while retaining the capacitance constant. This result is accomplished by positioning two of the electrodes on the outer surface of the monolithic structure and by using a less expensive noble metal or noble metal alloy for these electrodes, If, for example, a capacitor, for a given capacitance rating, required four electrodes, two platinum electrodes would be positioned within the monolithic structure and two electrodes would be layered onto the outer surfaces of the component. In this manner, considerable savings in the cost of the electrodes, and thus the cost of the capacitor, can be realized.

It is therefore an object of the present invention to provide an electronic component comprising a first set of electrodes, a second set of electrodes and a dielectric body characterized in that the electrodes of said first set have at least their major portion embedded in the dielectric body, the second set is formed on at least one surface of the dielectric body and at least one electrode of said first set and at least one electrode of said second set are in electrical communication with each other.

The present invention next approached the problem of how to manufacture the above described component. As will be presently explained, each external electrode covers a portion of one major surface and at least a portion of one minor surface of the monolithic dielectric body. A major surface is defined as a surface substantially parallel to the set of internal electrodes; and, a minor surface is defined as a surface substantially perpendicular to the set of internal electrodes. Thus, if there are to be two external electrodes four of the six surfaces of the dielectric body will be at least partially coated by the external electrodes. The problem then is how to cover two minor surfaces and two major surfaces with electrode material without spilling over onto the remaining two minor surfaces. The method of the present invention accomplishes this result by cutting the fired, alternating composite of dielectric and electrode layers into a series of one-component-wide "stick." The "sticks" are then faulted by forming a series of transversely extending grooves, with the distance between grooves corresponding to the desired length of the component. It will be noted that in the "stick" configuration, disregarding the extreme end surfaces which are covered with tape or other protective material, only four of the six surfaces that will comprise the finished component are visible; the remaining two faces abutting against the preceding and proceeding faces of the adjacent components. The "sticks" can then be either dipped in a mixture of the second electrode material and a bonding agent, to cause the second electrode material to adhere to the dielectric body, or the mixture can be sprayed onto the "sticks."

It should be understood at this juncture that the choice to provide a method of preparing electronic components comprising the steps of forming an elongated substantially one component wide structure of alternating layers of a dielectric material and a first electrode material such that the first electrode material layers have at least a major portion thereof embedded in the dielectric material; faulting the structure by removing at least a portion of the outermost layer of dielectric material to form at least one transversely extending groove; covering selected portions of the structure with a second electrode material and bonding the second electrode material to the dielectric body; and, breaking the structure along the fault lines to produce at least two components.

It is therefore a further object of the present invention of platinum as the internal electrode material is by way of example only; the invention presented herein being directed to an electronic component having at least one electrode coated onto an external surface thereof and not to a particular combination of electrode materials.

The subject matter which applicants regard as their invention is particularly pointed out and distinctly claimed in the concluding portion of this specification. The invention, however, as to its organization and method of operation together with further objects and advantages thereof will best be understood by reference to the following description taken in conjunction with the accompanying drawings in which:

FIGURE 1 is a view in perspective of a first embodiment of the electronic component of the present invention;

FIGURE 2 is a perspective view of the elongated "stick" which is an intermediate step in the preparation of the electronic component of the present invention;

FIGURE 3 is a view in perspective of a second embodiment of the electronic component of the present invention; and FIGURE 4 is a perspective view of the elongated "stick" for the second embodiment of the electronic component of the present invention.

Referring now to FIGURE 1, a first embodiment of the capacitor of the present invention shown generally at 10, comprises a monolithic dielectric body 20 formed of alternating layers of a dielectric material and a first electrode material. In its preferred form the first electrode material is platinum, although any other suitable conductor may be used, the dielectric material may be either ceramic, glass, or a glass-ceramic mixture and the first set of electrodes 16, 18 are embedded in the dielectric body. As shown in FIGURE 1, the first set, or internal electrodes 16, 18, are substantially parallel to each other and one edge of each electrode extends outwardly along its major plane to a minor surface of the dielectric body 20, a major surface or plane being here defined as one substantially parallel to the set of internal electrodes; and, a minor surface or plane being one substantially perpendicular to the set of internal electrodes.

It should be understood, at this point, that there may be any number of internal electrodes, two being shown to retain simplicity in the drawings and intended by way of example only. From a cost standpoint, the most expensive item in a capacitor of this type is the electrode material. Platinum, for example, in a form suitable for use as electrode material costs over $200 per ounce and is becoming increasingly difficult to procure. The unique physical and electrical properties plus the relative inertness of pure platinum, however, make it an ideal electrode material so that the problem becomes one of trying to retain the qualities that platinum brings to a capacitor while reducing the actual quantity of platinum used. The present invention addresses itself to this problem by reducing the number of platinum electrodes while maintaining the capacitance of a given component constant. This result is accomplished by positioning at least one and preferably two of the electrodes on the outer surface of the dielectric body and by using a less expensive noble metal or noble metal alloy, such as, for example, silver, gold, palladium, platinum, iridium, ruthenium or combinations thereof, for these external electrodes. Thus, for example, if a given capacitance rating required four electrodes, two electrodes would be positioned within the dielectric body and two electrodes would be coated, or otherwise layered, onto the outer surface of the dielectric body.

As shown in FIGURE 1, each of the external electrodes 12, 14 extends along a portion of a major surface of the component and substantially covers the adjacent minor surface of the component. The minor surface portion of each external electrode must extend at least to, and electrically contact, the exposed edge portion of each of its corresponding internal electrodes. The major surface portion of each external electrode is designed with its edge portion climaxing short of the far edge of the dielectric body to prevent the external electrodes from coming into contact and shorting the component.

Referring now to FIGURE 3, a second embodiment of the capacitor of the present invention will be described in detail. The capacitor, shown generally at 200, comprises a series of internal electrodes 216, 218, which may be platinum or any other suitable material, arranged in alternate layers with a dielectric material to form a monolithic dielectric body 220. As in the embodiment of FIGURE 1, at least one, and preferably two, external electrodes 212, 214 are coated or otherwise layered on at least a portion of the major surfaces of the dielectric body 220. Continuation of the external electrodes onto a minor surface of the dielectric body, while not shown in the drawing, is optional; if the electrodes are continued onto the adjacent minor surface the major surface edge of the external electrode opposite the corresponding minor surface extension would climax short of the dielectric body edge to prevent the external electrodes from contacting and shorting the component.

Electrical communication between the internal and external sets of electrodes may be maintained through the contact between the minor surface continuation of the external electrode and the exposed edge of the corresponding external electrodes, as was described for the embodiment of FIGURE 1; or, alternatively, a cut or section 222, 224 may be made in the corresponding minor surface of the dielectric body, with an end of the cut corresponding to the major surface portion of the external electrode. The cut is then filled, during the coating operation, with external electrode material to provide the contact between the corresponding sets of internal and external electrodes. An advantage of this embodiment is that the internal electrodes need not extend to the surface of the dielectric body, each of the external electrodes, as can be seen, extends into the dielectric body to provide the necessary electrical communication with its corresponding internal electrodes.

Turning now to FIGURES 2 and 4, the preferred method of manufacturing the capacitor of the present invention will be described in detail. It will be noted that the component shown in FIGURE 2 is similar to that of FIGURE 1 and that enumerated parts of FIGURE 2 corresponding to enumerated parts of FIGURE 1 are preceded by the prefix 1, e.g., part 116 of FIGURE 2 corresponds to part 16 of FIGURE 1. Similarly, the component shown in FIGURE 4 is similar to that of FIGURE 3 and enumerated parts of FIGURE 4 corresponding to enumerated parts of FIGURE 3 are preceded by the prefix 3, e.g., part 324 of FIGURE 4 corresponds to part 224 of FIGURE 3. The preferred process begins by preparing and firing, in a manner known in the art, a multi-component wide and multi-component long composite structure made up of alternating layers of dielectric material and the first electrode material. The composite is then cut into the "sticks" depicted in FIGURES 2 and 4, which are substantially one component wide and at least two components long. A series of transversely extending grooves 326 is cut, at least part way, across the width of each "stick," creating a fault or break-line; the longitudinal distance between the faults corresponding to the length of the component. If the capacitor of FIGURE 3 is the chosen embodiment, the removal procedure is continued making the cuts 222, 224 on opposite minor surfaces of each component on the "stick." The "stick" is then dipped in a mixture of the second electrode material and a bonding agent or the mixture is sprayed onto the "stick" to coat the components with the second electrode material. The external electrodes can be prevented from contacting each other by covering the adjacent edges of the component material with a protective material prior to coating and removing the protective material after coating, much the same way the extreme ends of the "stick" are protected from being coated. Alternatively, the components can be rolled in a milling machine to remove the second electrode material coating from the corners and edges of the component. Since only the corners and edges of the component will come in contact with the milling basket only the objectionable portions of the second electrode material coating will be removed. After coating, the individual components are broken off of the "stick" by fracturing the "stick" at the fault lines.

As this invention may be embodied in several forms without departing from the spirit or essential character thereof, the present embodiments are illustrative and not restrictive. The scope of the invention is defined by the appended claims rather than by the description preceding them and all embodiments which fall within the meaning and equivalency of the claims are therefore intended to be embraced by those claims.

What is claimed is:

1. An electronic component comprising a dielectric material body; a first set of capacitor electrodes embedded in the dielectric material body; and, a second set of electrodes formed onto selected outer surfaces of the dielectric material body, each member of the second set of electrodes comprising a first capacitor portion formed on a major surface of the dielectric material body and covering at least a majority of the area on that major surface of the dielectric material body and a second terminal portion formed on a minor surface of the dielectric material body and covering at least a majority of the area on that minor surface of the dielectric material body, each member of the first set of capacitor electrodes has an edge which extends to but does not overlap one of the minor surfaces of the dielectric material body and into electrical contact with one of the second terminal portions of the second set of electrodes, each member of the second set of electrodes being formed on opposing sides of the dielectric material body with each first capacitor portion being formed on opposing major surfaces and each terminal portion being formed on opposing minor surfaces.

2. An electronic component as defined in claim 1 wherein the first set of electrodes is comprised of a first conductive material and the second set of electrodes is comprised of a second conductive material.

3. A capacitor as defined in claim 1 wherein said internal electrodes are comprised of at least one metal chosen from the group: platinum, palladium, gold, silver, iridium and ruthenium.

4. A capacitor as defined in claim 3 wherein said external electrodes are comprised of at least one metal chosen from the group: platinum, palladium, gold, silver, iridium and ruthenium.

5. A capacitor as defined in claim 1 wherein said internal electrodes are platinum and said external electrodes comprise at least one metal chosen from the group: palladium, gold, silver, iridium and ruthenium.

6. An electronic component as defined in claim 1 wherein there is a section cut into at least one minor surface of the dielectric material body, the section containing a conductive material and electrically interconnecting selected members of the first set of capacitor electrodes with the second terminal portion of the second set of electrodes formed onto the minor surface of the dielectric material body.

7. An electronic component as defined in claim 1 wherein the first capacitor portion and second terminal portion are integrally connected and the second terminal portion electrically interconnects the first capacitor portion and selected members of the first set of capacitor electrodes.

References Cited
UNITED STATES PATENTS

| | | | |
|---|---|---|---|
| 2,395,442 | 2/1946 | Ballard | 317—261 X |
| 2,437,212 | 3/1948 | Schottland | 317—261 |
| 2,919,483 | 1/1960 | Gravley | 317—261 X |
| 2,972,570 | 2/1961 | Haas | 317—261 X |
| 3,183,419 | 5/1965 | Rieth | 317—242 |
| 3,260,907 | 7/1966 | Weller | 317—261 |
| 3,379,943 | 4/1968 | Breadlove | 317—258 |

E. A. GOLDBERG, Primary Examiner

U.S. Cl. X.R.

317—261